A. JAUCH.
CLUTCH.
APPLICATION FILED NOV. 27, 1916.
1,241,631.
Patented Oct. 2, 1917.
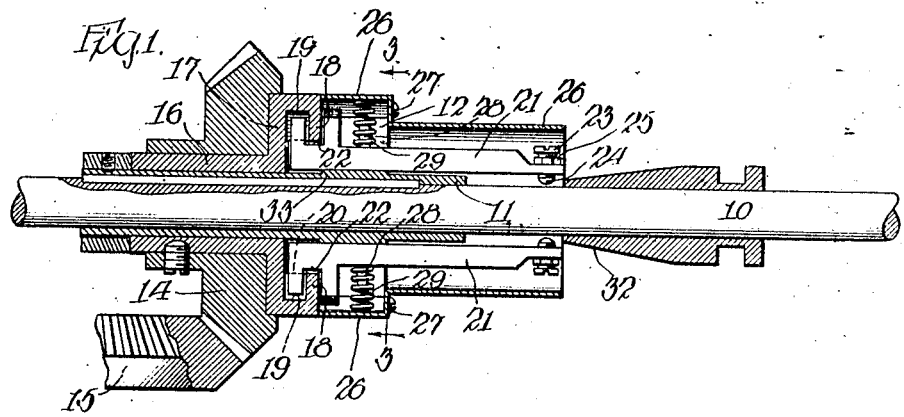
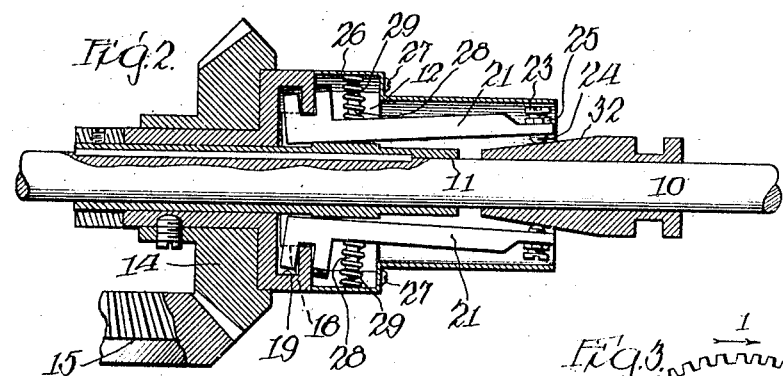
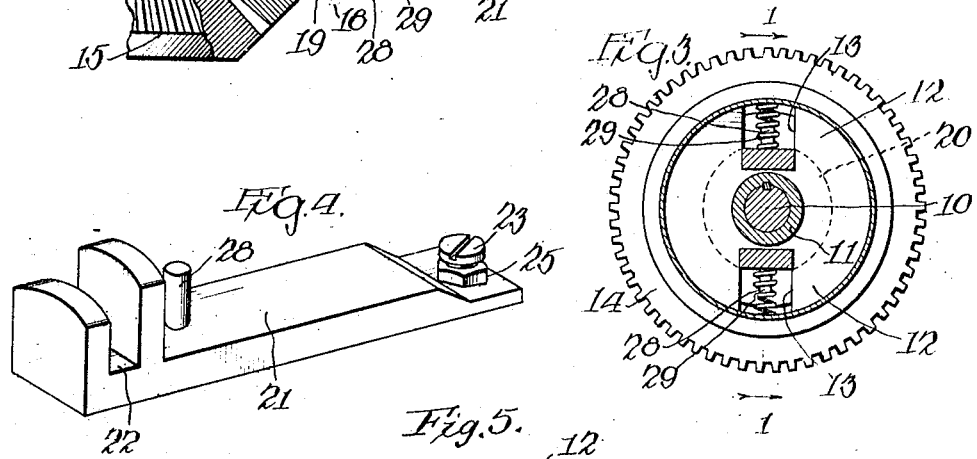
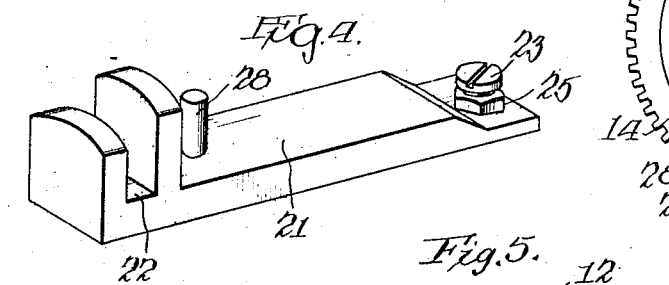
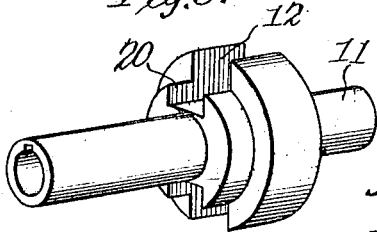
Witness:
Leo. D. Mais
Inventor:
Albert Jauch
By Robt. Klotz
Atty.

UNITED STATES PATENT OFFICE.

ALBERT JAUCH, OF CHICAGO, ILLINOIS.

CLUTCH.

1,241,631.  Specification of Letters Patent.  Patented Oct. 2, 1917.

Application filed November 27, 1916. Serial No. 133,523.

*To all whom it may concern:*

Be it known that ALBERT JAUCH, a subject of the Emperor of Germany, residing at Chicago, in the county of Cook and State of Illinois, have invented certain new and useful Improvements in Clutches, of which the following is a specification.

My invention relates to clutches and has for its primary object the provision of an improved clutch which shall have improved means for connecting together a rotatable element and a rotatable member.

A further object of my invention lies in the provision of a clutch having arms by means of which great leverage is obtained in the clutching position.

A further object of my invention lies in the provision of a clutch which shall be easy to assemble, readily mounted upon the ordinary line shaft, and economical to manufacture.

With the above and other objects in view, this invention consists substantially in the combination, arrangement and construction of parts all as hereinafter more fully described, shown in the accompanying drawings which form a part of this specification and illustrate the preferred embodiment of my invention, and more particularly set forth in the subjoined claims.

In the drawings—

Figure 1 is a longitudinal section through my invention approximately on line 1—1 of Fig. 3 and looking in the direction indicated by the arrows;

Fig. 2 is a view similar to Fig. 1, illustrating an adjusted position of the parts;

Fig. 3 is a section of my invention taken on line 3—3 of Fig. 1 and looking in the direction indicated by the arrows;

Fig. 4 is a perspective view of one of the clutch arms of my invention; and

Fig. 5 is a perspective view of a portion of a line shaft showing the slotted collar of my invention fixed thereon.

Reference numeral 10 indicates a rotatable element comprising a line shaft of the ordinary type, to which is keyed a bushing 11 provided for the purpose of holding away from the shaft a pair of clutch arms to be described. If desired the bushing 11 may be an integral part of the shaft 10. Fixed with relation to the shaft 10 and bushing 11 is an axially slotted collar 12, the slots 13 of which are preferably diametrically opposite each other.

Reference numeral 14 indicates a member to be rotated comprising for example, as illustrated, a pinion 14 adapted to drive a gear 15. At 16 is shown a sleeve rotatable upon the bushing 11 and fixed with respect to the pinion 14. The sleeve is enlarged circumferentially as at 17, and carries an inturned annular flange 18, which is removed from the enlargement 17 sufficiently to form an annular channel 19. The slotted collar 12 is reduced at its inner end as at 20 where it enters the flange 18, for the purpose of continuing the slots 13 across the channel 19.

Longitudinally disposed within the channels 13 are a pair of clutch arms 21 which are transversely channeled as at 22 at their inner ends to receive the flange 18. At their outer ends the arms 21 preferably carry setscrews 23, having rounded inner ends 24 and provided each with a lock-nut 25, the rounded inner end 24 standing opposite the line shaft 10. A casing 26 is secured by screws 27 to the outer face of collar 12. This casing extends over the collar and terminates adjacent to the outer face of the flange 18. A stud 28 projects outwardly from each arm 21 and carries a coil spring 29 the outer end of which abuts against the casing 26. The coil springs 29 maintain arms 21 normally in engagement with the bushing 11, so that the channels 22 are slightly spaced from and exactly alined with the inturned flange 18. In this manner there is normally no friction between the arms 21 and the flange 18. Upon the line shaft is provided an idler 30 having a channel 31 for engagement with a lever (not shown) and provided at its inner end with a tapered spreader 32, the idler being adapted to slide upon the shaft 10 and, by contact between the ends 24 of screws 23 and the tapered portion 32, to move the outer ends of the arms 21 away from shaft 10. Such movement of the arms causes a binding of the flange 18 within the channels 22 at the inner ends of the arms and results in holding the line shaft 10 in fixed relation to the pinion 14. As seen in Fig. 2, the channeled flange receiving portion of the arm 21 is in each case adjacent the inner end of the arm, while the application of the power to the arm is at its opposite end. Preferably an annular raised shoulder 33 is formed on the bushing 11 at a point substantially opposite the bottom of channel 22 of each arm. This shoulder 33 forms the fulcrum for the arm. The fulcrum and load being very near each other, it will be seen that the remoteness of the point at which power is applied to the arm causes the arm to exert great pinching leverage upon the flange 18. The extension 20 of collar 12 by projecting into flange 18 and the hollow between the flange and the enlargement 17 forms a lateral support for the circumferential thrust exerted upon the channeled ends of arms 21 when my invention is in the operative position illustrated in Fig. 2. It is possible to operatively construct my invention employing a single arm only but a plurality of arms results of course in a better balanced clutch.

While I have illustrated and described the preferred embodiment of my invention, it will be apparent that one skilled in the art can make modifications thereof without departing from the spirit of the invention. I wish therefore not to be restricted to the precise embodiment shown except in so far as the same is limited in the appended claims.

I claim:

1. In combination a rotatable element, a rotatable member, a collar axially slotted and fixed to said element, a sleeve having an annular flange protruding from it and fixed to said member, clutch arms carried in the slots of said collar and transversely channeled at one end to receive said flange, and a tapered device movable against said arms to bind their channeled ends about said flange.

2. In combination a rotatable element, a rotatable member, a collar axially slotted and fixed to said element, a sleeve having an annular inturned flange and fixed to said member, clutch arms carried in the slots of said collar and transversely channeled at one end to receive said flange, and a tapered device movable against said arms to bind their channeled ends about said flange.

3. In combination a rotatable element, a rotatable member, a collar axially slotted and fixed to said element, a sleeve having an annular inturned flange and fixed to said member, clutch arms carried in the slots of said collar and transversely channeled at one end to receive said flange, and a tapered device movable against said arms to bind their channeled ends about said flange, said collar projecting within the flange to form a transverse support for the channeled ends of the arms.

4. In combination a rotatable element, a rotatable member, a collar axially slotted and fixed to said element, a sleeve having an annular inturned flange providing an inwardly exposed channel and fixed to said member, clutch arms carried in the slots of said collar, projecting into said channel, and themselves transversely channeled at one end to receive said flange, and a tapered device movable against said arms to bind their channeled ends about said flange.

5. In combination a rotatable element, a rotatable member, a collar axially slotted and fixed to said element, a sleeve having an annular inturned flange providing an inwardly exposed channel and fixed to said member, clutch arms carried in the slots of said collar, projecting into said channel, and themselves transversely channeled at one end to receive said flange, a tapered device movable against said arms to bind their channeled ends about said flange, a casing carried by said element and projecting over the slots of said collar, and coil springs interposed between each arm and said casing.

6. In combination a rotatable element, a rotatable member, a collar axially slotted and fixed to said element, a sleeve having an annular inturned flange providing an inwardly exposed channel and fixed to said member, clutch arms carried in the slots of said collar, projecting into said channel, and themselves transversely channeled at one end to receive said flange, a tapered device movable against said arms to bind their channeled ends about said flange, a casing carried by said element and projecting over the slots of said collar, and coil springs interposed between each arm and said casing, the outer ends of said arms carrying adjustable inwardly exposed anti-friction pieces for engagement with said tapered device.

7. In combination a rotatable element, a rotatable member, a collar axially slotted and fixed to said element, a sleeve hollowed at one end provided with an inturned flange, and fixed to said member, clutch arms carried in the slots of said collar and formed to receive said flange, a shoulder on said element substantially opposite the inner edge of said flange, and means for separating the free ends of said arms.

8. In combination a rotatable element, a rotatable member, a collar axially slotted and fixed to said element, a sleeve hollowed at one end provided with an inturned flange, and fixed to said member, clutch arms carried in the slots of said collar and formed to receive said flange, a shoulder on said element substantially opposite the inner edge of said flange, means for separating the free ends of said arms, and resilient devices maintaining said arms normally out of contact with the flange.

In testimony whereof I have affixed my signature.

ALBERT JAUCH.